United States Patent [19]

Fiocca

[11] 3,968,413

[45] July 6, 1976

[54] VARIABLE SPEED STARTER FOR X-RAY TUBES

[75] Inventor: Louis L. Fiocca, Bensenville, Ill.

[73] Assignee: Advanced Instrument Development, Inc., Melrose Park, Ill.

[22] Filed: Oct. 21, 1974

[21] Appl. No.: 516,752

[52] U.S. Cl. .................................. 318/230; 318/231

[51] Int. Cl.[2] .......................................... H02P 7/42

[58] Field of Search ........... 318/138, 227, 230, 231, 318/490, 500

[56] References Cited

UNITED STATES PATENTS

| | | | |
|---|---|---|---|
| 3,416,057 | 12/1968 | Froyd et al. | 318/231 X |
| 3,474,320 | 10/1969 | Chandler | 318/227 X |
| 3,482,157 | 12/1969 | Borden et al. | 318/227 |
| 3,641,408 | 2/1972 | Fiocca | 318/227 |

*Primary Examiner*—Gene Z. Rubinson
*Attorney, Agent, or Firm*—Leo J. Aubel

[57] ABSTRACT

A solid state starter to selectively accelerate X-ray tube rotors to the low speed utilized for fluoroscopic examinations and up to the high speed required for spot-film or radiographic exposure operation, and wherein the speeds of the rotor may be varied throughout the speed range.

4 Claims, 1 Drawing Figure

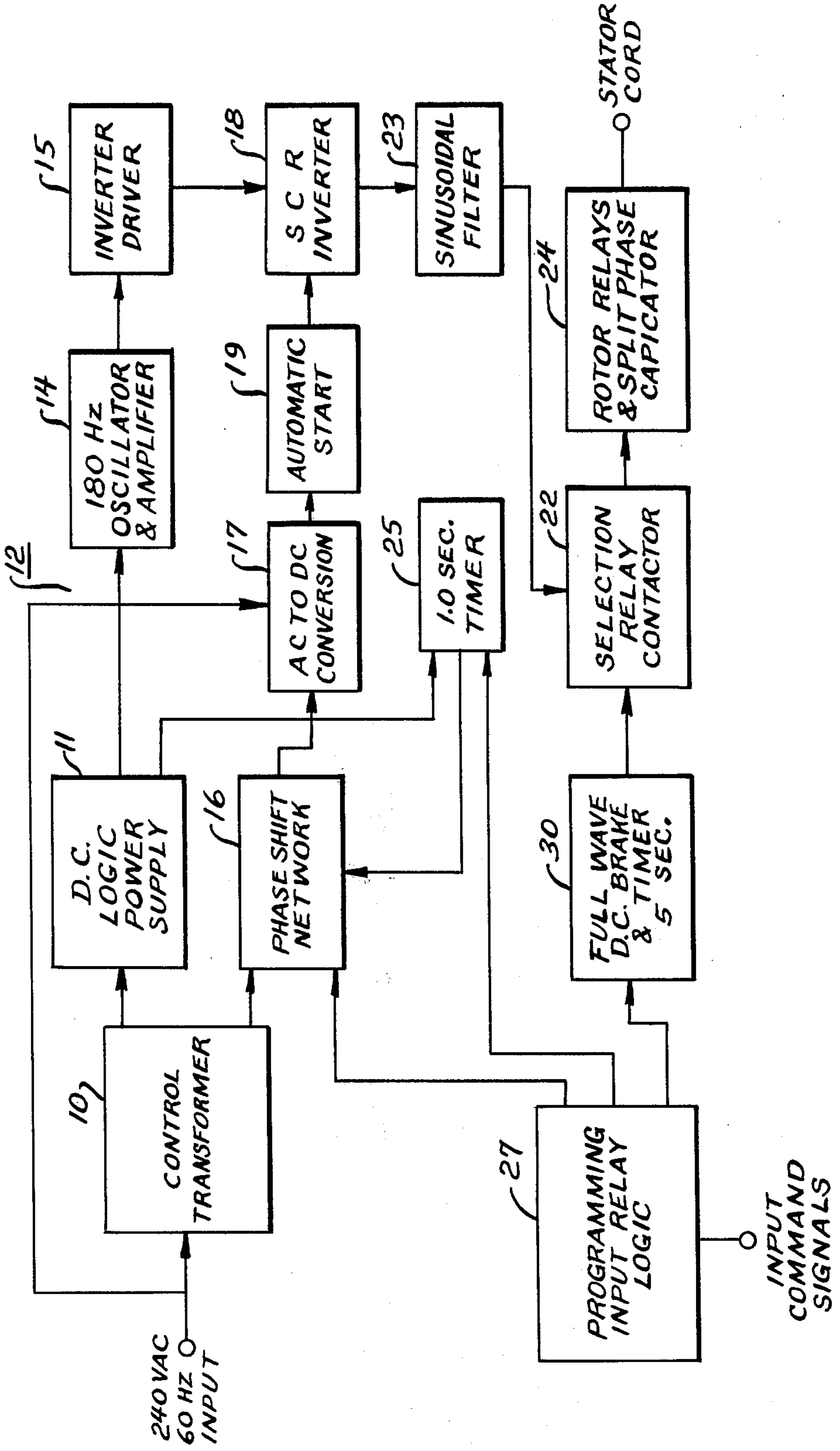
240 VAC 60 HZ INPUT
10 CONTROL TRANSFORMER
11 D.C. LOGIC POWER SUPPLY
12
14 180 Hz OSCILLATOR & AMPLIFIER
15 INVERTER DRIVER
16 PHASE SHIFT NETWORK
17 AC TO DC CONVERSION
18 S C R INVERTER
19 AUTOMATIC START
22 SELECTION RELAY CONTACTOR
23 SINUSOIDAL FILTER
24 ROTOR RELAYS & SPLIT PHASE CAPICATOR
25 1.0 SEC. TIMER
27 PROGRAMMING INPUT RELAY LOGIC
30 FULL WAVE D.C. BRAKE & TIMER 5 SEC.
STATOR CORD
INPUT COMMAND SIGNALS

VARIABLE SPEED STARTER FOR X-RAY TUBES

BACKGROUND OF THE INVENTION

The present invention relates to U.S. Pat. No. 3,641,408 and to the corresponding Reissue Patent No. 28,618 entitled "SOLID-STATE POWER SUPPLY SYSTEM FOR ROTATING ANODE X-RAY TUBES," issued to Louis L. Fiocca and assigned to the same assignee as the present invention. Louis L. Fiocca, the inventor of the system of Reissue Patent No. 26,618 is also the inventor of the present invention and Mr. Fiocca's continuing work with the system disclosed in the Reissue Patent No. 28,618 resulted in the improvement comprising the present invention.

As will be appreciated, the present invention utilizes a similar concept, and much of the circuitry disclosed is the system of the Reissue Patent No. 28,618 and, in fact, the present invention eliminates a significant portion of the circuitry of the system disclosed in the Reissue Patent No. 28,618 while providing an improved operating result. Accordingly, for the purpose of simplification of the description of the circuitry in this application, reference as appropriate is made to said Reissue Patent No. 28,618 for the details of the circuitry shown and described therein.

X-ray tubes having rotatable anodes are well known. In such tubes, the anode is caused to rotate to present a continually changing target area so that heat generated by the X-ray bombardment may be more easily dissipated. This heat dissipation enables higher energy levels to be used resulting in increased X-ray output as compared with tubes having fixed anodes.

The rotating anodes of X-ray tubes are generally driven with split phase motors and in fact may be the rotors of said motors. The motors have been heretofore operated from power sources capable of providing either 60 Hz or 180 Hz A.C. control power to enable anode rotation at a first relatively low speed and at a second relatively high speed. Such prior art systems require means to accelerate from a quiescent condition to attain the final operating speed for the X-ray anode in the desired operating running mode.

The rotating anode and the motor drive generally exhibit mechanical resonances at the speed in the range of 4,000 to 6,000 and RPM and it is desirable to make the transistion through such resonances both on acceleration and deceleration of the anode as briefly as possible to minimize bearing wear of the anode system and to minimize undue strain on the bearing mounts and the tube structure.

In the prior art, X-ray tube starter systems, such as shown in the Reissue Patent No. 28,618, a first starter or drive system has been utilized to drive the rotor up to its slow speed operating condition and a second starter has been utilized to drive the rotor to its high speed operating condition. Two essentially separate starting systems are employed, and the systems operate in generally digital or discrete fashion.

In contrast to the prior art, the present starter and drive system operate in an analog manner and can be controlled to accelerate or boost the rotor to a first selected running speed, and can also be controlled to accelerate and boost the rotor to a second selected running speed, and either of the selected running speeds can be varied within a given operating range.

The well known principle of phase control of SCR's (silicon controlled rectifiers) described and utilized in Reissue Patent No. 28,618 is also utilized and applied in the present invention.

Briefly, and as is well known, an SCR which is gated or triggered to conduction, will conduct for the remainder of a half cycle of the A.C. (alternating current) wave provided to its anode - cathode current path. Thus, dependent on the point at which the SCR is triggered to conduction, relative to the phase angle of the applied A.C. wave, the SCR will conduct current for a selected controllable time period.

Consider briefly an application of the present invention. An X-ray examination will conventionally have at least two X-ray tubes; one of the tubes is normally for doing fluoroscopic examinations and is referred to as "undertable tube," and the other tube is normally used for doing radiographic exposures and is commonly referred to as the "overtable tube". For doing fluoroscopic examinations, the undertable tube is operated at a relatively low speed such as at 100 RPM and therefore, this tube requires a low speed starter to boost the rotating speed of the rotor to a desired relatively low rotating speed. In contrast, radiographic exposures are preferably done at high speeds, say at 10,000 RPM, and therefore the overtable tube requires a high speed starter to boost rotating speed of the rotor to a relatively high running speed. The present invention provides a single starter and drive means for accelerating and operating both of the aforesaid tubes at the required operating speeds.

As discussed above, the circuitry in the present application is similar to that of the Reissue Patent No. 28,618 with the improvement that the 60 Hz phase shift network block 20, the 60 Hz SCR bridge 21 and the 24 VDC logic power supply 11 coupled to block 20, and the two second timer 26 are removed from the system of the present invention. In addition to eliminating components and circuitry and reducing costs, the present circuitry provides improved operating results over the circuit disclosed in U.S. Pat. No. 3,641,408, as will be explained.

As also mentioned hereinabove, since the circuitry of the present invention is in considerable part the same as that described in the Reissue Patent No. 28,618, reference is specifically made to that patent as needed to clarify the description of the present invention. And the reference numerals referring to the blocks in the FIGURE of the present invention refer to the similarly numbered blocks in FIG. 1 of the Reissue Patent No. 28,618.

DESCRIPTION OF THE SOLE FIGURE

The sole FIGURE of the invention is a block diagram of a solid-state power supply system, which embodies the present invention for the drive motor of a rotating anode X-ray tube.

DESCRIPTION OF THE INVENTION

Refer now to the sole FIGURE which shows the system 12 of the present invention. In operation, a 240 volt A.C. 60 Hz input voltage applied to a control transformer 10 supplies a 24 volt D.C. power supply and a 180 Hz phase shift network 16 with appropriate input voltages. As mentioned above, the blocks of system 12 have been described in detail in Reissue Patent No. 28,618, and need no further description herein.

Power supply 11 generates D.C. output voltage of approximately 24 volts which are employed to supply a 180 Hz oscillator amplifier 14. Oscillator amplifier 14 develops a 180 Hz output signal which is supplied through an inverter driver 15 to SCR inverter 18 to develop a 180 Hz square wave output signal. A sinusoidal filter 23 derives the fundamental component of the square wave output from SCR inverter 18 to deliver 180 Hz sine wave signal to selection relay contactor 22, and then through rotor relays and split phase capacitor network 24 to the stator terminals of the drive motor for the X-ray anode tube to thereby provide the motor with a high speed synchronous driving power.

The selection relay contactor 22 also receives an input from full wave D.C. brake and timer 30 which provides a selective 5 second D.C. signal comprising a rectifier pulsating A.C. signal to provide a braking action to the anode rotor.

The remaining portion of the circuit to be described provides a means for controllably operating the motor at a selected accelerating or boosted voltage condition, at the selected running speed or for maintaining the motor at its quiescent condition. The programming input relay logic 27 controls the amount of phase shift provided by a phase shift network 16. Phase shift network 16 develops a signal which controls the amplitude of the output signals from the A.C. to D.C. Conversion unit 17 which comprises a full wave bridge circuit, and the signal to determine the operating mode of the motor, as will be explained.

The A.C. to D.C. Conversion unit 17 provides a D.C. driving signal which is coupled to the SCR inverter 18. As also described in the Reissue Patent No. 28,618, dependent on the programmed input signal, for the programming input relay logic 27, the output provided by Conversion unit 17 can be 0° to 180° out of phase with the input to the A.C. to D.C. Conversion unit 17 from the 240 VAC 60 Hz input.

When the phase shift provided by phase shift network 16 is 0°, the firing angles of the A.C. to D.C. Conversion unit, or full wave SCR bridge circuit 17, is such as to allow nearly 180° of conduction of each of the SCR's. This is the boosted condition and will allow maximum current flow in the full wave bridge circuit 17. The output from the SCR bridge circuit 17 charges associated output capacitors and the charge on the capacitors provides an increased D.C. voltage which increased or boosted voltage constitutes the supply voltage for the 180 Hz inverter 18. The inverter 18 is a free running inverter commutated by a capacitor in a conventional McMurray Bedford which drives the primary winding of a transformer whose output in turn powers the anode motor.

In the run condition of the motor, a phase shift is provided to the SCR Conversion unit 17 such that the firing angle of the SCR's is less than 0°. Accordingly, the charge on the associated capacitors is a reduced D.C. voltage and the inverter 18 operates at this reduced voltage level.

The phase shifted signal provided by the network 16, thus controls the output from SCR bridge circuit 17 and thus SCR bridge circuit 17 can be controlled to provide an added voltage or drive to the inverter circuit 18 to vary the drive to the anode motor from a maximum acceleration to a minimum acceleration or run condition in an analog or smooth manner dependent on the input from the programming input relay logic 27.

The inventive system 12 can thus be connected or switched to provide a boost voltage to a selected X-ray anode rotor. The boost voltage can be utilized to provide a required acceleration to an anode rotor and/or a desired increase in the anode rotor running speed.

The one second timer 25 is coupled to phase shift network 16, and provides means for automatically timing the time period of the boost mode of operation. The timing sequence or period of the timer 25 is initiated by the programming input relay logic 27.

The full wave D.C. brake and timer provides a 5 second braking signal programmed by the programming input logic 27 to provide the braking to the anode rotor. The braking signal comprises, in effect, a full wave rectified A.C. signal.

While the invention has been particularly shown and described with reference to a preferred embodiment thereof, it will be understood by those skilled in the art that various changes in form and details may be made therein without departing from the spirit and scope of the invention.

What is claimed is:

1. A system operable from an alternating current source, for controllably providing power to an induction motor for driving rotating anodes of X-ray tubes, said motor being operable to selectively drive the anode within a given speed range at a first low rate of speed and at a second higher rate of speed, a drive control circuitry for controlling the operation of the motor at the low speed operation and said same drive control circuitry controlling the operation of the motor at the higher speed operation, analog operating means for said control circuitry for providing voltages at selected first levels to the motor to thereby accelerate the anode to the selected speed within the given range, and said analog operating means providing voltages at selected second levels to the motor to maintain the anode rotating at the selected speed.

2. A system as in claim 1 comprising means for multiplying the frequency of the alternating current, an inverter for receiving the current at the multiplied frequency and providing driving power to said motor, a phase shift network for receiving the alternating current and shifting the phase thereof, programming means for determining the amount of phase shift provided by said phase shifting network, SCR bridge means for converting alternating current to direct current and coupling said direct current to said inverter, means coupling said phase shifted current from said phase shift network to said SCR bridge, and the output from said SCR bridge being dependent on said phase shift network, and the output from said SCR bridge to said inverter determining the drivng power coupled from said inverter to said motor to thereby control in an analog manner the acceleration of said motor and also its speed of rotation.

3. A system as in claim 2 further including means for timing the length of the period said phase shifting network provides an output to said SCR bridge and the time said SCR bridge provides a maximum output.

4. A system as in claim 2 wherein the programming means determines the firing angle of said SCR bridge and the output of said SCR bridge determines the power output from said inverter.

* * * * *